(12) United States Patent
Utley et al.

(10) Patent No.: US 10,805,471 B1
(45) Date of Patent: Oct. 13, 2020

(54) DISPARATE CONFERENCE SYSTEM CONNECTOR

(71) Applicant: West Corporation, Omaha, NE (US)

(72) Inventors: Doug Utley, Kansas City, KS (US); William F. Krasso, Bellevue, NE (US)

(73) Assignee: West Corporation, Omaha, NE (US)

( * ) Notice: Subject to any disclaimer, the term of this patent is extended or adjusted under 35 U.S.C. 154(b) by 8 days.

(21) Appl. No.: 15/341,669

(22) Filed: Nov. 2, 2016

(51) Int. Cl.
- H04M 3/42 (2006.01)
- H04M 3/56 (2006.01)
- H04L 29/06 (2006.01)

(52) U.S. Cl.
CPC .......... H04M 3/56 (2013.01); H04L 65/4046 (2013.01)

(58) Field of Classification Search
CPC .... H04M 3/436; H04M 3/42059; H04M 3/56; H04M 3/568
USPC .......... 379/201.01, 202.01; 455/416
See application file for complete search history.

(56) References Cited

U.S. PATENT DOCUMENTS

| | | | |
|---|---|---|---|
| 6,967,672 B1* | 11/2005 | Huber | H04N 7/147 348/14.08 |
| 8,380,521 B1* | 2/2013 | Maganti | H04L 65/403 370/260 |
| 2004/0028200 A1* | 2/2004 | Carlson | H04M 3/382 379/201.01 |
| 2016/0269687 A1* | 9/2016 | Boneh | H04L 12/1813 |

* cited by examiner

*Primary Examiner* — Rasha S Al Aubaidi

(57) ABSTRACT

Providing disparate conference system connection, comprising: assigning by a first party conference system a first party passcode, assigning by the first party conference system a third party identifier to a third party conference system, authenticating by the first party conference system utilizing the third party identifier and the first party passcode the third party conference system and converging by the first party conference system a conference communication linkage of the first party conference system with the authenticated third party conference system.

15 Claims, 8 Drawing Sheets

DISPARATE CONFERENCE SYSTEM CONNECTOR

BACKGROUND

The present disclosure is generally related to connecting disparate conference systems so that they may be used in a linked conference.

There are a large number of incompatible conferencing systems which allow only users of that specific conferencing system to utilize it for a conference. The ability to utilize a conferencing system that the user is acquainted with in a conference hosted on another type of system allows the user to immediately get past the learning curve associated with a new system and concentrate on the meeting, not learning a new system.

Therefore, allowing converged conferencing of disparate systems allows communication to take place with users of disparate systems without the need to learn a new system.

SUMMARY

In one embodiment, a method comprises at least one of: assigning by a first party conference system a first party passcode, assigning by the first party conference system a third party identifier to a third party conference system, authenticating by the first party conference system utilizing the third party identifier and the first party passcode the third party conference system and converging by the first party conference system a conference communication linkage of the first party conference system with the authenticated third party conference system.

In another embodiment, a non-transitory computer readable medium comprises instructions that when read by first party conference system performs at least one of: assigning by a first party conference system a first party passcode, assigning by the first party conference system a third party identifier to a third party conference system, authenticating by the first party conference system utilizing the third party identifier and the first party passcode the third party conference system and converging by the first party conference system a conference communication linkage of the first party conference system with the authenticated third party conference system.

In a further embodiment, a system comprises a first party conference system, wherein the first party conference system performs at least one of: assigning by a first party conference system a first party passcode, assigning by the first party conference system a third party identifier to a third party conference system, authenticating by the first party conference system utilizing the third party identifier and the first party passcode the third party conference system and converging by the first party conference system a conference communication linkage of the first party conference system with the authenticated third party conference system.

DETAILED DESCRIPTION

It may be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be included in at least one example of the present application. Thus, appearances of the phrases example, examples, in some examples, in other examples, or other similar language, throughout this specification does not necessarily refer to the same group of examples, and the described features, structures, or characteristics may be combined in a suitable manner in one or more examples.

Currently, disparate conferencing systems may not be easily interconnected to allow users of the different systems to be able to have a common conference call. This inability to interconnect different conferencing systems leaves users with the options of either not joining a call in a system that they are unfamiliar with or joining and spending time learning the system while trying to concentrate on the conference call. What is needed is the ability to initiate a conference interconnection between two disparate systems such as Intercall®, in this example a first party conferencing system with a third party conferencing system. Additionally, it is envisioned that individual conference capabilities are maintained for public switched telephone network (PSTN) and/or dual tone multi-frequency (DTMF) phone systems.

Figure 1:
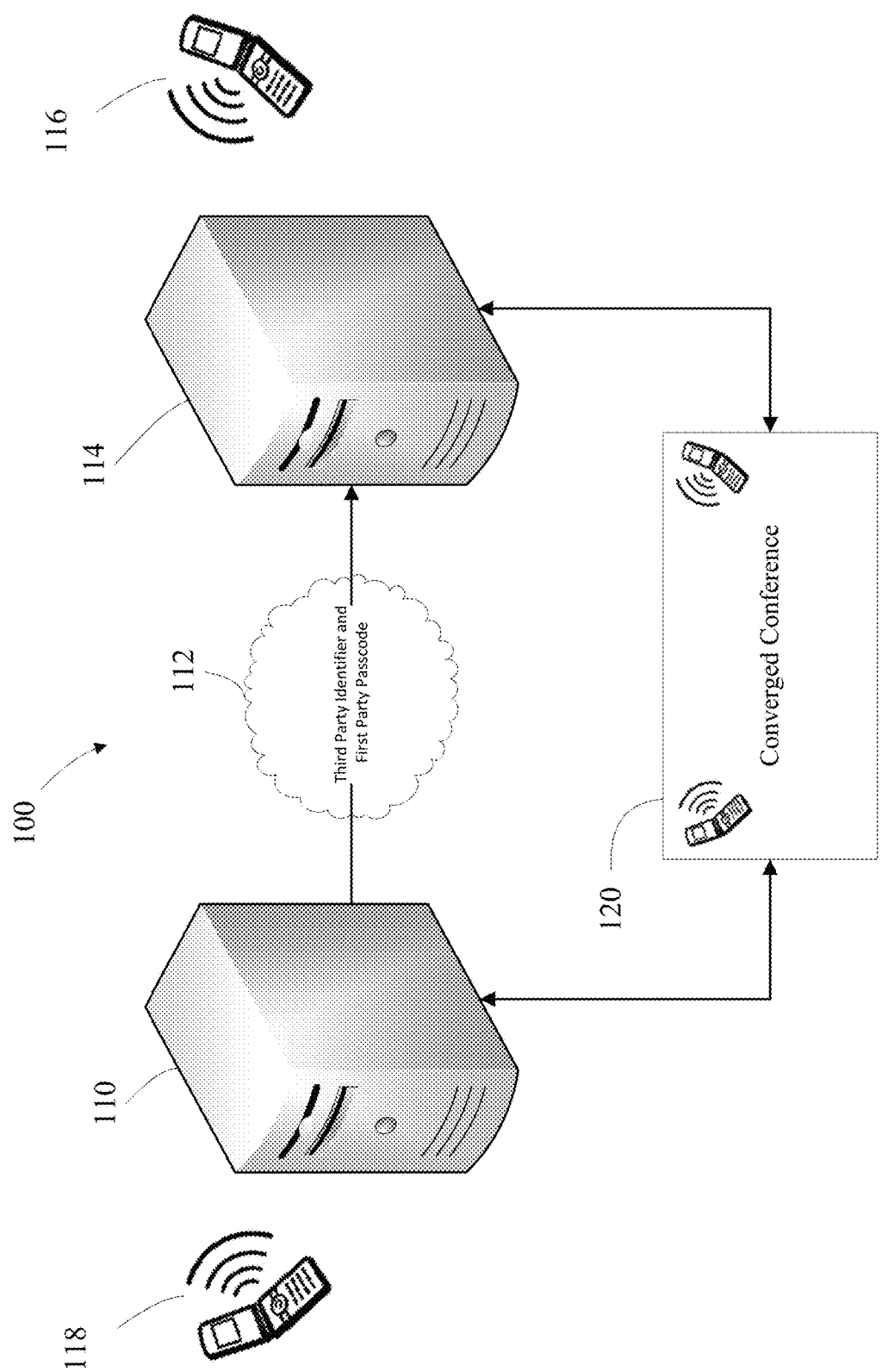
FIG. 1 depicts a first example system in accordance with one embodiment of the disclosure.

Computer System FIG. 1 illustrates the system architecture for an exemplary computer system 100 with which the current disclosure may be implemented. The exemplary computer system of FIG. 1 is for descriptive purposes.

System 100 includes a first party conference system 110 that is able to send 112 a third party identifier and first party passcode to a third party conference system 114 by means of the internet, a network, a cloud connection or the like. In this case the first party conference system 110 accepts the third party identifier and first party passcode as the criteria for authentication of the third party system. Once the third party system has been authenticated a conference including both the users of the third party system 116 and the users of the first party system 118 may meet at a converged conference 120.

A first example method by which the audio conferencing platform assigns a third party DTMF identifier in conjunction with the individual's first party conferencing passcode to initiate a single, managed audio linkage between the two disparate systems. In this example, John Smith's first party audio conference uses passcode 123456789#. A third party system audio connection initiated from the third party system video server may input via DTMF out-pulse dialing the passcode at the prompt for "enter your audio conferencing passcode". At that point, the first party audio conferencing service does not know who or what is calling into the conference. Utilizing automatic number identification (ANI) recognition is not a secure or reliable method. In this example, the third party service is assigned a third party identifier and a passcode in order to identify the inbound line and have the audio conferencing service take specific actions on that line. In this example, the format for the third party input is [third party identifier]*[first party conference passcode]. In this example, the third party system would send the following when prompted for a passcode—5555502021*123456789#. The specified identifier of 5555502021 directs the audio conference platform to place the inbound line into the conference, start it if it is currently in an on Music state, an on Hold state and disallow MUTE this line and not to send/receive any additional DTMF signals from the line. This audio line becomes a conduit between the third party service where there may 300 participants connected to the third party servers and the InterCall® conference platform were there may be 500 participants.

Figure 2:
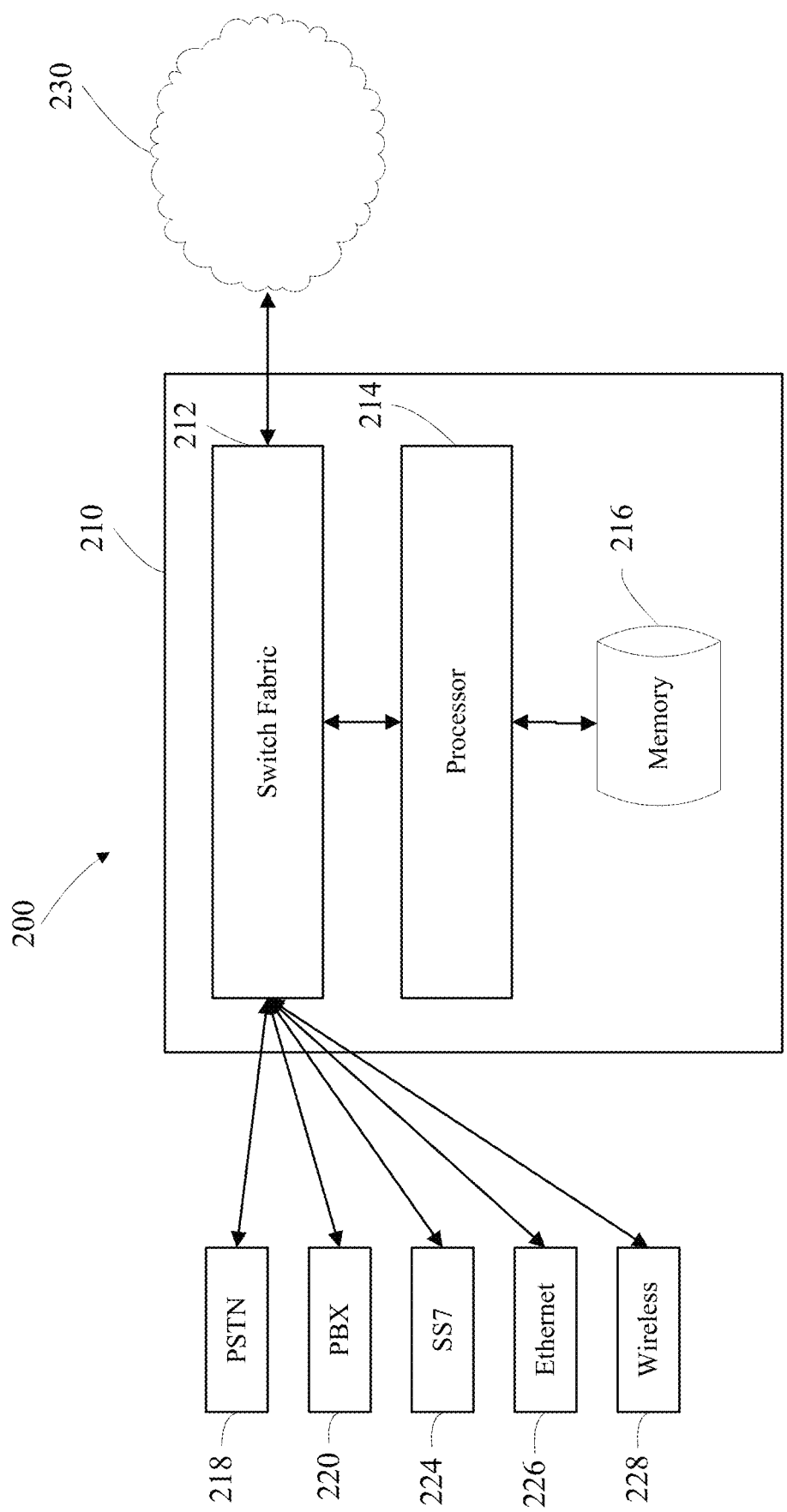
FIG. 2 depicts an example conferencing system in accordance with one embodiment of the disclosure.

Computer System FIG. 2 illustrates a conferencing system 200 with which the current disclosure may be implemented. The conferencing system 210, has a switch fabric 212 connected to at least one processor 214 which in turn is connected to a memory 216 which contains instructions to control the processor and the switch fabric. The switch fabric 212 may be connected to PSTN systems 218, private branch exchange (PBX) systems 220, signaling system 7 (SS7) systems 224, Ethernet 226, wireless systems 228 and the like. The switch fabric 212 is also connected to the internet, network or cloud 230.

Figure 3:
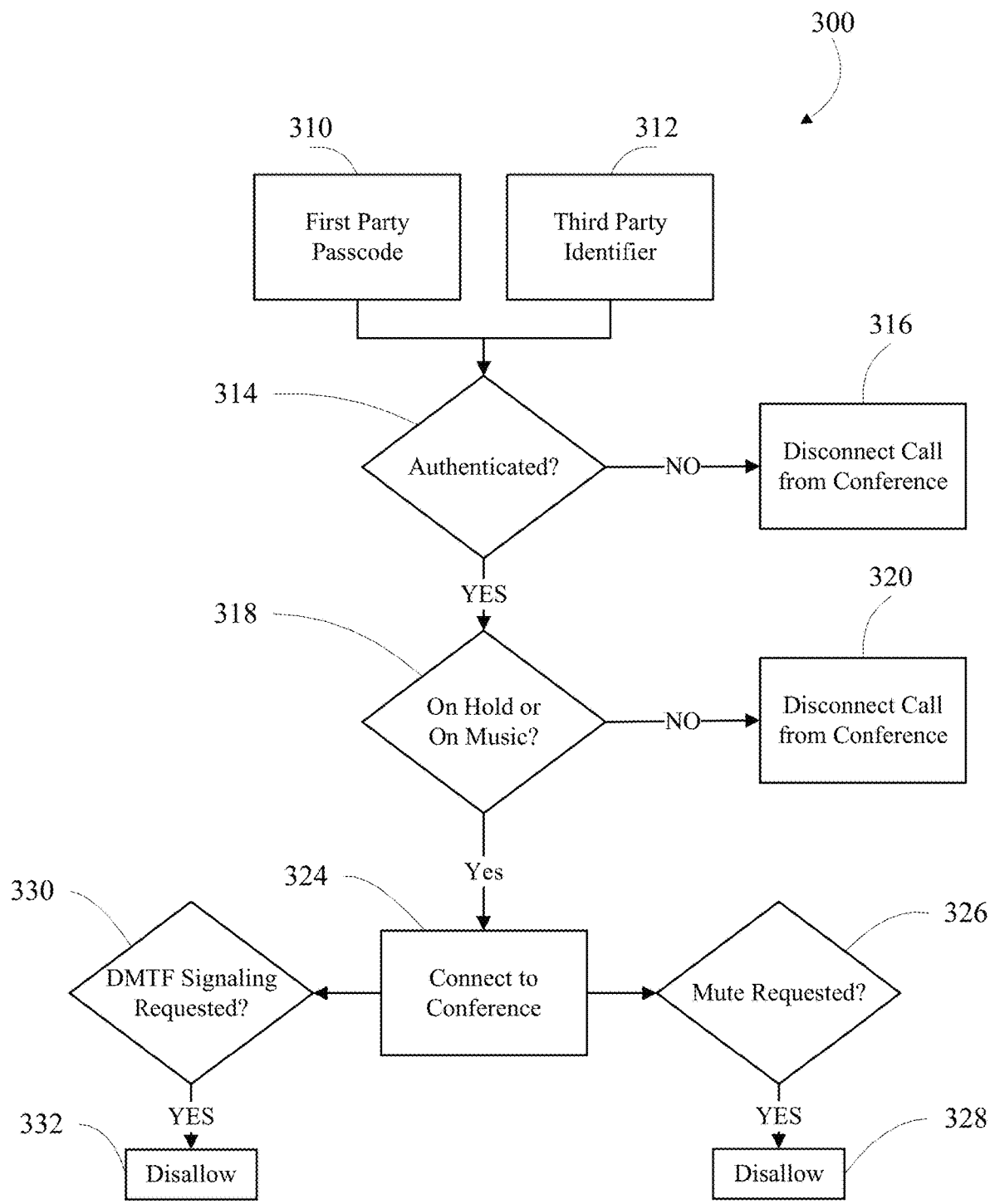
FIG. 3 depicts an example logic flow in accordance with one embodiment of the disclosure.

Referring now to FIG. 3, an example logic flow diagram is depicted. A first party conference system (110 FIG. 1) assigns 310 a first party passcode, the first party conference system assigns 312 third party identifier to a third party conference system (114 FIG. 1), the first party conference system utilizing the third party identifier and the first party passcode authenticates 314 the third party conference system and the first party conference system converges (120 FIG. 1) a conference communication linkage of the first party conference system with the authenticated third party conference system. If the call is not authenticated it is disconnected 316. The third party system is converged into the conference audio linkage if the third party system is on music 318 and the third party system is converged into the conference audio linkage if the third party system is in an on hold state 318. If the call is not in an on hold state or an on music state the call is disconnected 320. The third party system disallows 328 the conference audio linkage to utilize mute 326 after it has been converged and disallowing 332 the third party system which has been converged into the conference audio linkage to utilize DTMF signals 330.

The first party conference system identifies the third party conference system connection line independently from other lines in the audio conference, identifies and supports connection types for a third party conference system connection line; e.g. session initiation protocol (SIP), enterprise connectivity conferencing (ECC), Dial-In, Dial-Out connection types and java messaging service (JMS) messages that are applicable. The first party conference system identifies the third party conference system for different connection types that can be utilized by first party conference system in order to make call flow decisions and call direction assignments in a call data records (CDRs) file.

The third party identifier may be a DTMF digit string of for example *(third party identifier)(random string)=*7777700000*. The third party identifier may be blocked in databases that track customer information, conference call reservations and the like, as not to be issued to an owner. If an incorrect third party identifier is provided, then the conference line may be disconnected without messaging. The first party conference system would place a third party conference system connection into the conference automatically. Messaging into the conference may be based on a feature setting for the third party conference system.

Features on an owner account may not be played into the conference; e.g. security passcode/project accounting code. If the conference is recording on for first party conference system when the third party conference system connection is joined, the recording message may be played to third party conference system connection on join.

Setups may be made according to the feature set identified for the third party conference system connection. If the third party conference system "Announce XX third party conference system connection" feature is turned off, then silent entry is envisioned. If a message is selected, then a message is sent to the conference as determined for the third party conference system. The first party conference system may establish a third party conference system connection and activate the conference when there are users on audio. The third party conference system connection may not have leader functionality or account setting capabilities.

The first party conference system disallows DTMF commands through the third party conference system connection line after the connection has been established. Conference breakdown settings may be applied to the line for disconnection. It is envisioned that there would be no custom modification for the third party conference system connection line. The conference breakdown and leader grace period account settings would be utilized to determine if the line is to be terminated.

The third party conference system connection line would be counted as a participant line; if the third party conference system connection is the "ONLY" participant in the conference then the line may be disconnected. The operators may observe the connection type in the conference details view.

The third party conference system connection type may be displayed based upon a Short Name for the type field. This may enable fraud management to be able to detect the different third party conference system connection types and connection may be dropped based upon role and/or permission settings.

The first party conference system may identify the third party conference system connection in the call data records so that billing may be applied appropriately. This identifier may be utilized by the billing and reporting applications to identify the line appropriately on post conference emails, invoices and/or the like.

There may be a provisioning setting in the first party conference system features for third party conference system connections that the first party conference system may utilize to determine if a connection is or is not allowed. The third party conference system feature may default to on (allowed) and may be available following first party conference system feature management functionality.

Figure 4:
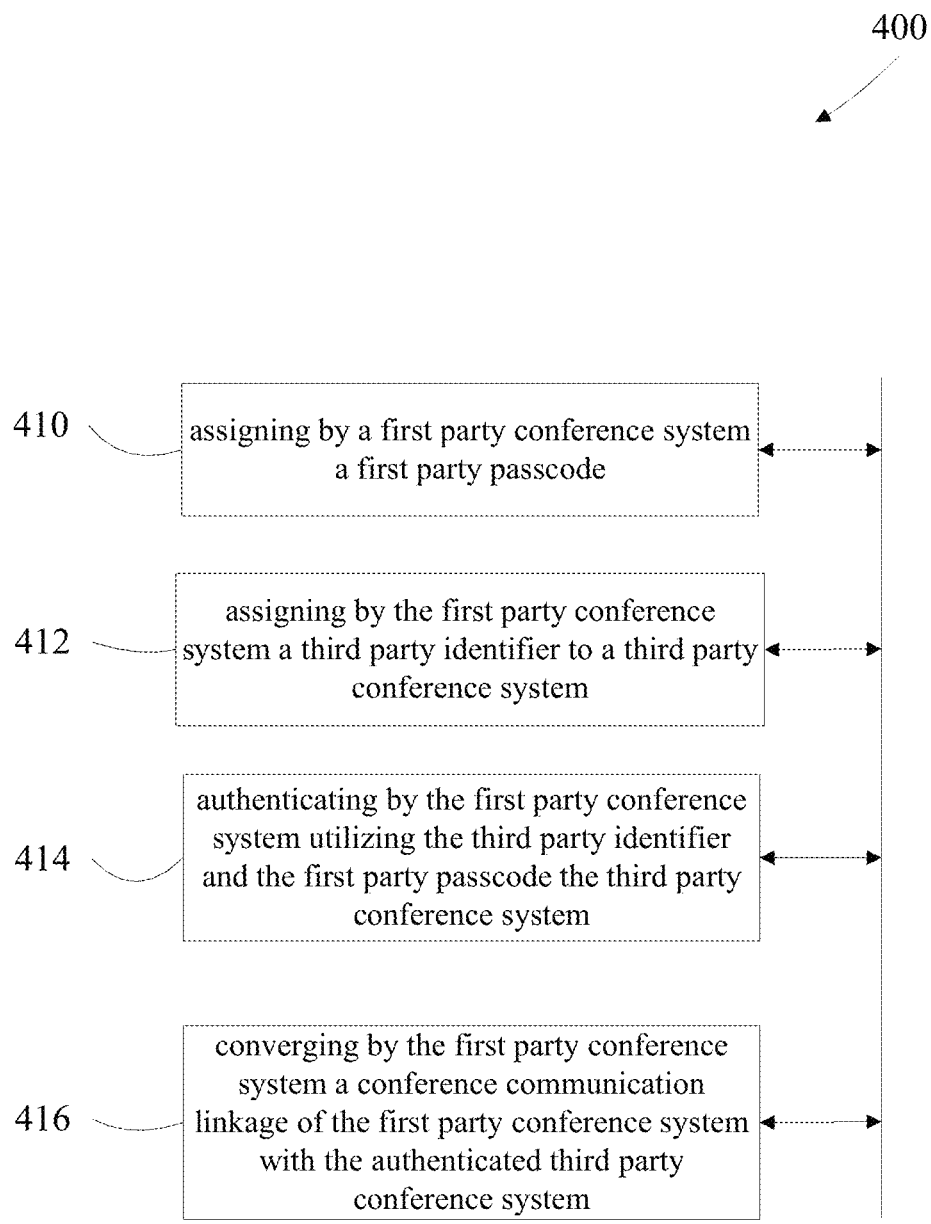
FIG. 4 depicts a first example method in accordance with one embodiment of the disclosure.

Referring now to FIG. 4, a method, comprising, assigning 410 by a first party conference system a first party passcode, assigning 412 by the first party conference system a third party identifier to a third party conference system, authenticating 414 by the first party conference system utilizing the third party identifier and the first party passcode the third party conference system and converging 416 by the first party conference system a conference communication linkage of the first party conference system with the authenticated third party conference system.

Figure 5:
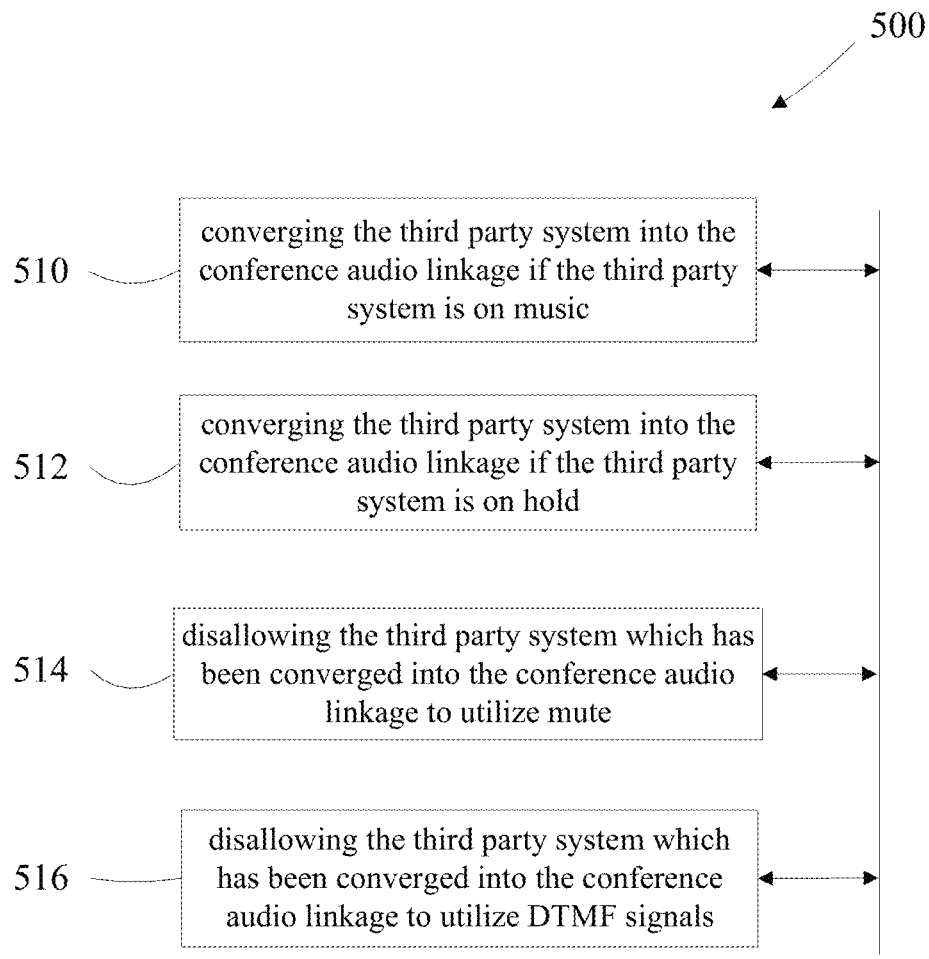
FIG. 5 depicts a second example method in accordance with one embodiment of the disclosure.

Referring now to FIG. 5, the method of FIG. 3 the first party conference system may comprise at least one of an audio conference system, a video conference system and a collaborative editing conference system. The third party conference system may comprise at least one of an audio conference system, a video conference system and a collaborative editing conference system and the third party identifier may be a DTMF string. The third party system allows the conference audio linkage if the third party system is on music 510 or on hold 512. The first party conference system disallows 514 the converged third party system to utilize mute and disallows 516 the converged third party system to utilize DTMF signals.

Figure 6:
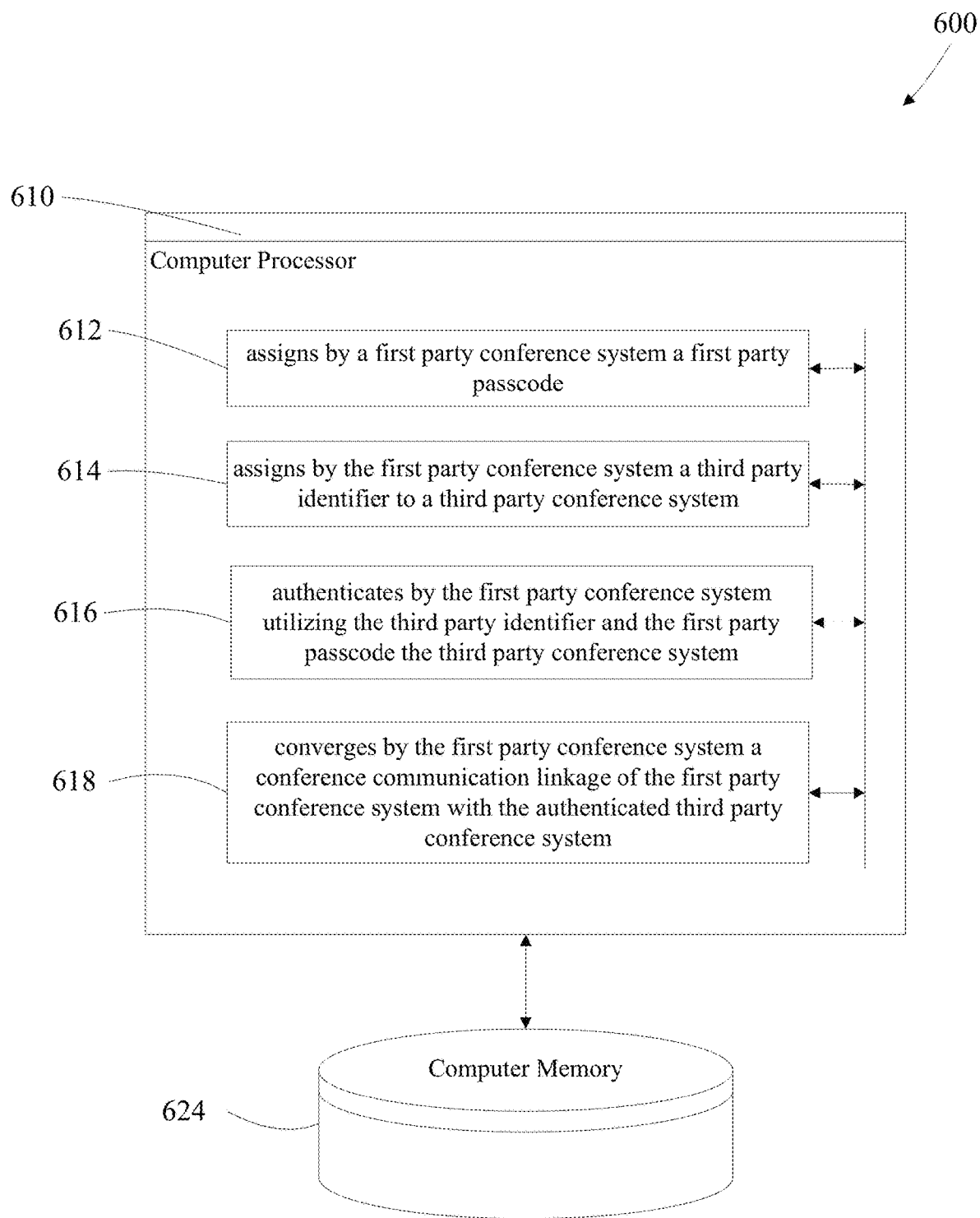
FIG. 6 depicts a second system example in accordance with one embodiment of the disclosure.

FIG. 6 depicts an apparatus comprising a first party conference system 610 that assigns 612 by a first party conference system a first party passcode, assigns 614 by the first party conference system a third party identifier to a third party conference system, authenticates 616 by the first party conference system utilizing the third party identifier and the first party passcode the third party conference system and converges 618 by the first party conference system a conference communication linkage of the first party conference system with the authenticated third party conference system.

The first party conference system may comprise at least one of an audio conference system, a video conference system and a collaborative editing conference system. The third party conference system may comprise at least one of an audio conference system, a video conference system and a collaborative editing conference system. The third party identifier may be a DTMF string. The first party system may converge the third party system into the conference audio linkage if the third party system is on music or on hold. The first party conference system may disallow the converged third party system to utilize mute or DTMF signals.

Figure 7:
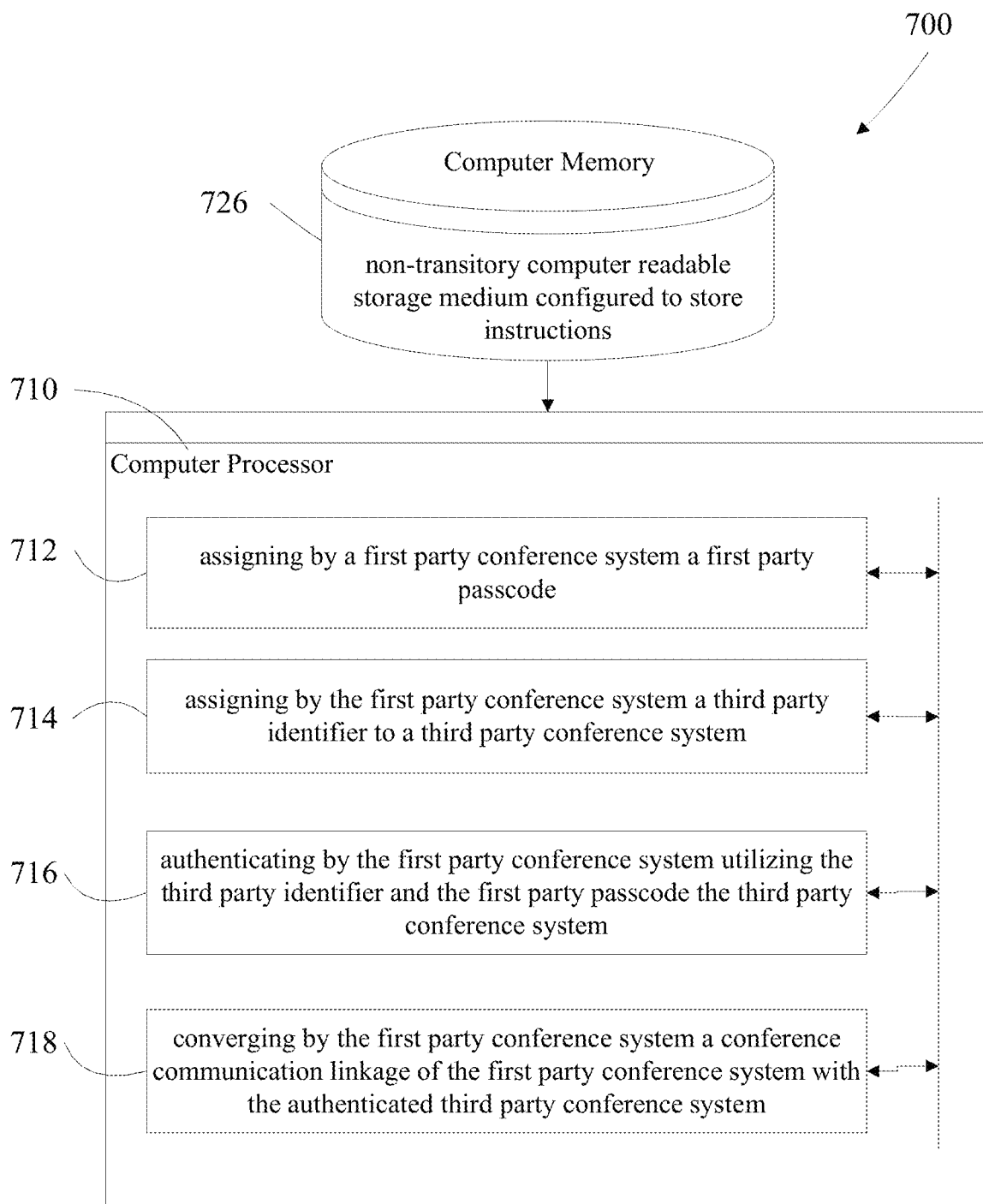
FIG. 7 depicts an example non-transitory computer readable medium in accordance with one embodiment of the disclosure; and, FIG. 8 depicts a medical conferencing system in accordance with one embodiment of the disclosure.

FIG. 7 depicts a non-transitory computer readable storage medium 726 to store instructions, that when executed cause a computer processor 710 of a first party conference system to perform, assigning 712 by a first party conference system a first party passcode, assigning 714 by the first party conference system a third party identifier to a third party conference system, authenticating 716 by the first party conference system utilizing the third party identifier and the first party passcode the third party conference system and converging 718 by the first party conference system a conference communication linkage of the first party conference system with the authenticated third party conference system.

Figure 8:
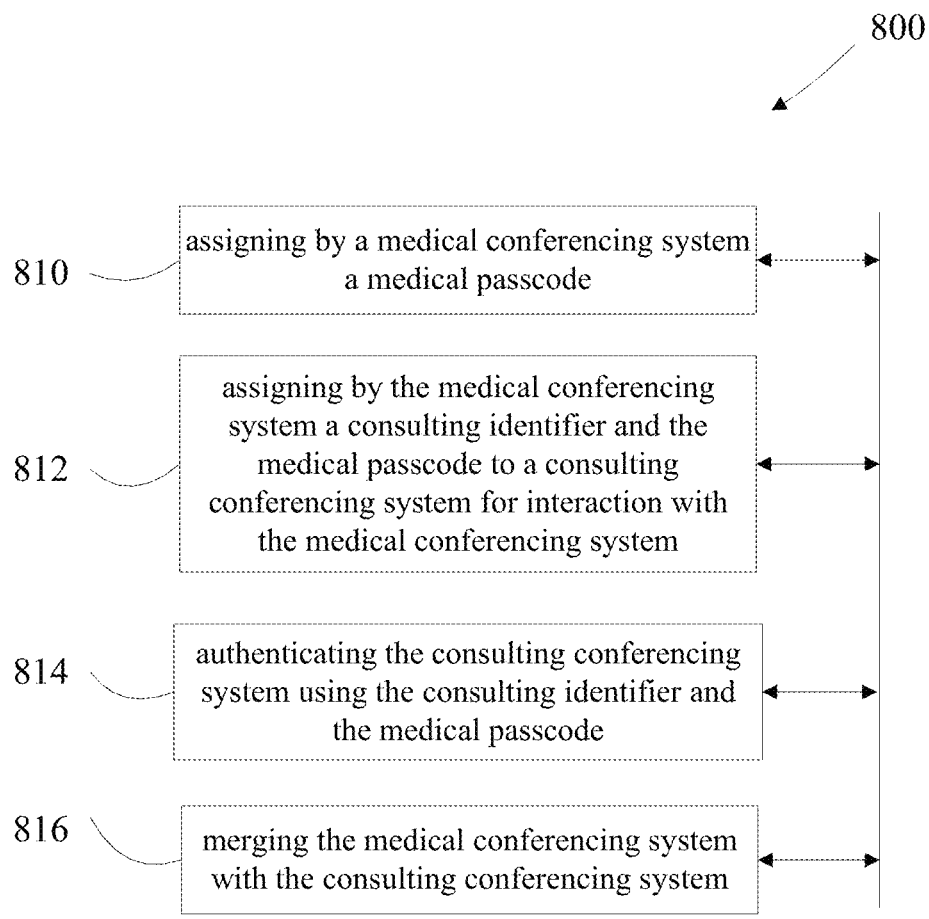

Another exemplary method depicted in FIG. 8 may comprise assigning 810 by a medical conferencing system a medical passcode, assigning 812 by the medical conferencing system a consulting identifier and the medical passcode to a consulting conferencing system for interaction with the medical conferencing system. The consulting conferencing system may be a consulting medical professional conferencing system such as one used by physicians offsite, or an offsite patient conferencing system, or the like. In this example the medical conferencing system would authenticate 814 the consulting conferencing system using the consulting identifier and the medical passcode and when the security safeguards are met, merge 816 the medical conferencing system with the consulting conferencing system.

The non-transitory computer readable storage medium of the first party conference system may comprise at least one of an audio conference system, a video conference system and a collaborative editing conference system. The third party conference system may comprise at least one of an audio conference system, a video conference system and a collaborative editing conference system. The third party identifier may be a DTMF string. The first party system may converge the third party system into the conference audio linkage if the third party system is on music or on hold. The first party conference system may disallow the converged third party system to utilize mute. The first party conference system may disallow the converged third party system to utilize DTMF signals.

Those skilled in the art will understand that the format, layout, and content of the data structure as shown in the figures is illustrative rather than limiting of the instant invention. Specifically, those skilled in the art will recognize that various changes, modifications, additions, omissions, or alterations may be made to the data structure shown without departing from the scope of the instant invention as recited in the claims appended hereto. More particularly, other types of computing devices such as mobile and those which provide a server function may be utilized.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, this may represent any of the above-described network components, etc.

Although an exemplary example of at least one of the system, method, and non-transitory computer readable medium of the present disclosure has been illustrated in the accompanied drawings and described in the foregoing detailed description, it may be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

The above examples are for illustrative purposes and are not intended to limit the scope of the disclosure or the adaptation of the features described herein to particular components. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced by examples in addition to those specifically described.

What is claimed is:

1. A method, comprising:
    assigning, by a first party conference system, a first party passcode, the first party conference system being of a first type;
    assigning, by the first party conference system, a third party identifier, including a DTMF string, to a third party conference system, the third party conference system being of a second type that is different than the first type;
    authenticating, by the first party conference system, the third party conference system based on the third party identifier and the first party passcode; and
    converging, by the first party conference system, a conference communication linkage of the first party conference system with the authenticated third party conference system to create a conference line, wherein the third party identifier is to prevent sending or receiving additional DTMF signals, other than the third party identifier, by the conference line.

2. The method of claim 1 wherein the first party conference system comprises:
    at least one of an audio conference system, a video conference system and a collaborative editing conference system.

3. The method of claim 1 wherein the third party conference system comprises:
    at least one of an audio conference system, a video conference system, and a collaborative editing conference system.

4. The method of claim 1, further comprising:
    converging the third party system into the conference communication linkage if the third party system is in at least one of an on music state and an on hold state.

5. The method of claim 1, further comprising:
    disallowing, by the first party conference system, the third party system from utilizing mute.

6. An apparatus comprising:
    a first party conference system of a first type, the first party conference system configured to:
        assign a first party passcode;
        assign a third party identifier, including a DTMF string, to a third party conference system of a second type different than the first type;
        authenticate the third party conference system based on the third party identifier and the first party passcode; and
        converge a conference communication linkage of the first party conference system with the authenticated third party conference system to create a conference line, wherein the third party identifier is to prevent sending or receiving additional DTMF signals, other than the third party identifier, by the conference line.

7. The apparatus of claim 6 wherein the first party conference system comprises:
    at least one of an audio conference system, a video conference system, and a collaborative editing conference system.

8. The apparatus of claim 6 wherein the third party conference system comprises:
    at least one of an audio conference system, a video conference system, and a collaborative editing conference system.

9. The apparatus of claim 6, wherein the first party conference system is configured to:
    converge the third party system into the conference communication linkage if the third party system is in at least one of an on music state and an on hold state.

10. The apparatus of claim 6, wherein the first party conference system is configured to:
    disallow the third party system from utilizing at least one of mute.

11. A non-transitory computer readable storage medium to store at least one instruction that when executed by a processor of a first party conference system, causes the processor to perform:
    assigning, by a first party conference system, a first party passcode, the first party conference system being of a first type;
    assigning, by the first party conference system, a third party identifier, including a DTMF string, to a third party conference system, the third party conference system being of a second type that is different than the first type;
    authenticating, by the first party conference system, the third party conference system based on the third party identifier and the first party passcode; and
    converging, by the first party conference system, a conference communication linkage of the first party conference system with the authenticated third party conference system to create a conference line, wherein the third party identifier is to prevent sending or receiving additional DTMF signals, other than the third party identifier, by the conference line.

12. The non-transitory computer readable storage medium of claim 11, wherein the first party conference system comprises:
    at least one of an audio conference system, a video conference system, and a collaborative editing conference system.

13. The non-transitory computer readable storage medium of claim 11, wherein the third party conference system comprises:
    at least one of an audio conference system, a video conference system and a collaborative editing conference system.

14. The non-transitory computer readable storage medium of claim 11, further to store at least one instruction that when executed by the processor causes the processor to perform:
    converging the third party system into the conference communication linkage if the third party system is in at least one of an on music state and an on hold state.

15. The non-transitory computer readable storage medium of claim 11, further to store at least one instruction that when executed by the processor causes the processor to perform:
    disallowing the third party system from utilizing mute.

* * * * *